United States Patent
Park et al.

(10) Patent No.: US 11,233,953 B2
(45) Date of Patent: Jan. 25, 2022

(54) IMAGE EDITING METHOD AND ELECTRONIC DEVICE SUPPORTING SAME

(71) Applicant: Samsung Electronics Co., Ltd., Gyeonggi-do (KR)

(72) Inventors: Miji Park, Gyeonggi-do (KR); Younghak Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/050,002

(22) PCT Filed: May 8, 2019

(86) PCT No.: PCT/KR2019/005468
§ 371 (c)(1),
(2) Date: Oct. 23, 2020

(87) PCT Pub. No.: WO2019/216630
PCT Pub. Date: Nov. 14, 2019

(65) Prior Publication Data
US 2021/0185243 A1    Jun. 17, 2021

(30) Foreign Application Priority Data

May 11, 2018 (KR) ........................ 10-2018-0054086

(51) Int. Cl.
*H04N 5/272* (2006.01)
*H04N 5/262* (2006.01)
(Continued)

(52) U.S. Cl.
CPC ......... *H04N 5/272* (2013.01); *G06F 16/9035* (2019.01); *G06F 16/90344* (2019.01); *H04N 5/2621* (2013.01); *H04N 2005/2726* (2013.01)

(58) Field of Classification Search
CPC ................. H04N 5/272; H04N 5/2621; H04N 2005/2726; H04N 5/232939;
(Continued)

(56) References Cited

U.S. PATENT DOCUMENTS 9,055,209 B2    6/2015 Shin
9,154,709 B2    10/2015 Cohen et al.
(Continued)

FOREIGN PATENT DOCUMENTS

JP    2007-11901 A    1/2007
JP    2011-175427 A    9/2011
(Continued)

*Primary Examiner* — Hung H Lam
(74) *Attorney, Agent, or Firm* — Cha & Reiter, LLC

(57) ABSTRACT

An embodiment of the present invention provides an electronic device comprising: a communication circuit; at least one camera device; a memory; a display; and a processor electrically connected to the communication circuit, the at least one camera device, the memory, and the display. The processor is configured to: determine a query on the basis of a user activity related to operation of the electronic device; confirm whether or not at least one external device connected through the communication circuit or the memory comprises an image effect filter corresponding to the query; acquire the image effect filter corresponding to the query from the at least one external device or the memory when it is confirmed that the at least one external device connected through the communication circuit or the memory comprises the image effect filter corresponding to the query; output an image taken by the at least one camera device through the display; and provide the acquired image effect filter when an event related to editing of the output image occurs. In addition, various embodiments recognized through the specification are possible.

15 Claims, 10 Drawing Sheets

(51) Int. Cl.
    *G06F 16/9035*     (2019.01)
    *G06F 16/903*     (2019.01)

(58) Field of Classification Search
    CPC ........... H04N 21/4318; H04N 21/4307; H04N 21/854; G06F 16/9035; G06F 16/90344; G06F 16/70
    See application file for complete search history.

(56) References Cited

U.S. PATENT DOCUMENTS

| | | |
|---|---|---|
| 9,438,791 B2 | 9/2016 | Cohen et al. |
| 10,606,456 B2 | 3/2020 | Shin |
| 2011/0213795 A1* | 9/2011 | Lee .................. G06F 16/51 707/769 |
| 2011/0292221 A1* | 12/2011 | Gu .................. H04N 5/23222 348/207.1 |
| 2014/0176732 A1* | 6/2014 | Cohen ............... H04N 21/4545 348/207.1 |
| 2015/0116529 A1 | 4/2015 | Wu et al. |
| 2016/0232426 A1* | 8/2016 | Wang .................. G06K 9/4652 |
| 2019/0124272 A1* | 4/2019 | O'Neill ............. H04N 5/23222 |

FOREIGN PATENT DOCUMENTS

| | | | |
|---|---|---|---|
| JP | 2015-154244 A | 8/2015 |
| KR | 10-2012-0072103 A | 7/2012 |
| KR | 10-1467293 B1 | 12/2014 |
| KR | 10-2015-0119801 A | 10/2015 |
| KR | 10-1688352 B1 | 12/2016 |

\* cited by examiner

IMAGE EDITING METHOD AND
ELECTRONIC DEVICE SUPPORTING SAME

CROSS REFERENCE TO RELATED
APPLICATIONS

This application is a National Phase Entry of PCT International Application No. PCT/KR2019/005468, which was filed on May 8, 2019, and claims a priority to Korean Patent Application No. 10-2018-0054086, which was filed on May 11, 2018 the contents of which are incorporated herein by reference.

TECHNICAL FIELD

Various embodiments disclosed herein are related to image editing technology.

BACKGROUND ART

With the rapid spread of electronic devices equipped with their own operating systems, the electronic devices are evolving into a medium in which various functions or infotainment services are integrated. For example, the electronic devices may support shooting of an image (e.g., still image or video) for an operating environment by mounting a high-spec image photographing device. Furthermore, the electronic devices may support image editing for giving a variety of atmospheres or highlights by processing a photographed image based on a specified application.

DISCLOSURE

Technical Problem

As part of image editing, the electronic device may provide, for example, an image effect filter that applies a black/white effect, a sepia effect, or a negative effect to the photographed image. However, the type of the image effect filter may be limited, and may not meet the user's own taste because the image effect filter is provided in a standardized type by an application developer or electronic device manufacturer supporting image editing.

Various embodiments disclosed herein may provide an image editing method capable of determining and recommending an image effect filter that a user prefers based on a user's electronic device operation history, and an electronic device supporting the same.

Technical Solution

According to an embodiment, an electronic device may include a communication circuit, at least one camera device, a memory, a display, and, a processor electrically connected to the communication circuit, the at least one camera device, the memory, and the display.

According to an embodiment, the processor may determine a query based on a user activity related to operation of the electronic device, determine whether an image effect filter corresponding to the query is included in at least one external device connected through the communication circuit or the memory, obtain an image effect filter corresponding to the query from the at least one external device and the memory when it is determined that the image effect filter corresponding to the query is included in the at least one external device or the memory, output an image photographed by the at least one camera device through the display, and provide the obtained image effect filter when an event related to editing of the output image occurs.

Advantageous Effects

According to various embodiments, it is possible to recommend an image effect filter related to a user's taste, interest, or preference in the case of editing an image.

According to various embodiments, it is possible to build an image editing platform optimized for a user by accumulating and managing recommended image effect filters.

In addition, various effects may be provided that are directly or indirectly understood through the disclosure.

DESCRIPTION OF DRAWINGS

In the description of the drawings, the same reference numerals may be used for the same or corresponding components.

MODE FOR INVENTION

Figure 1:
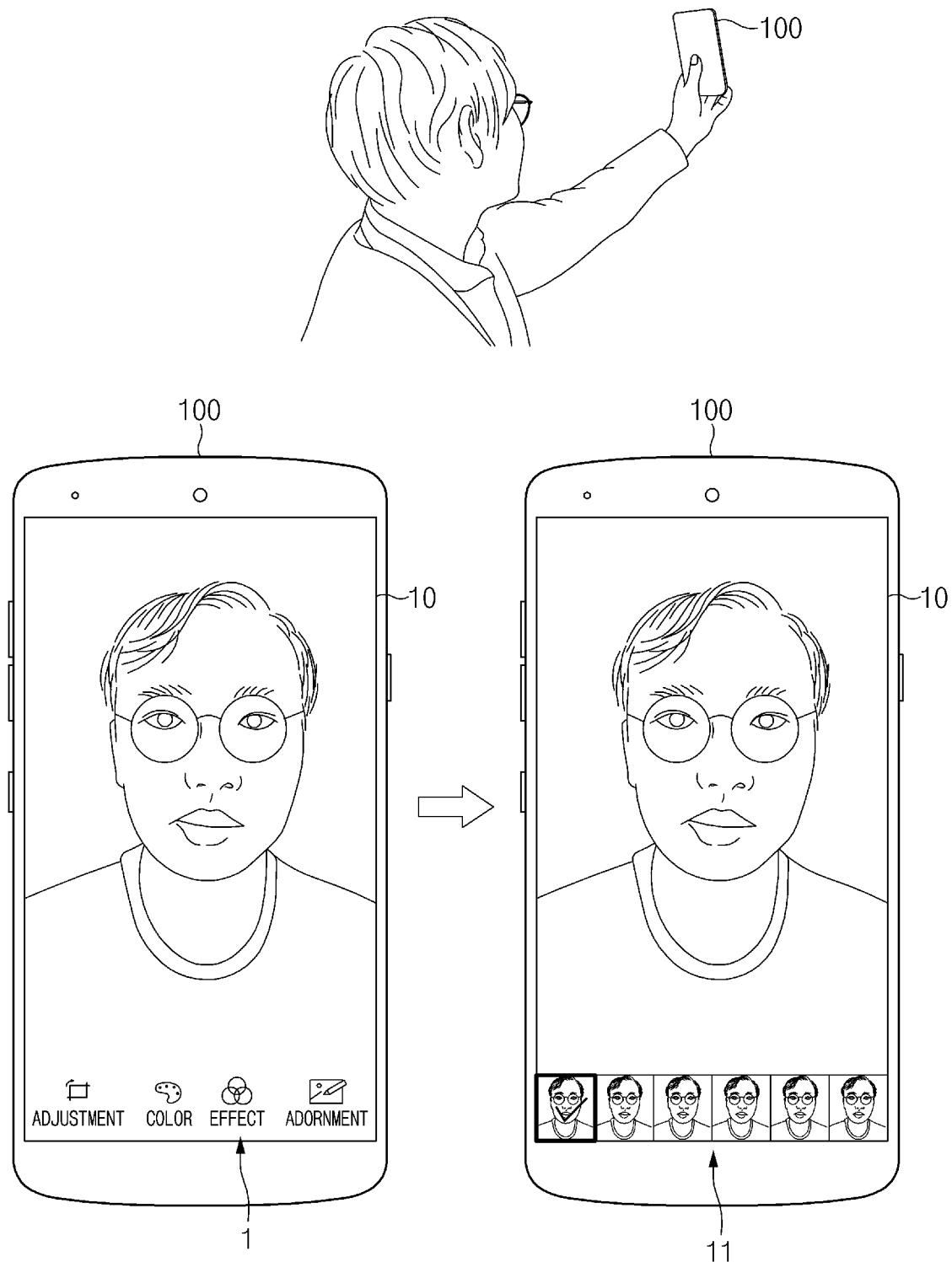
FIG. 1 is a diagram illustrating an example of operating an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a diagram illustrating an example of operating an electronic device according to an embodiment.

Referring to FIG. 1, an electronic device 100 may photograph an image (e.g., still image or video) for an operating environment of the electronic device 100 based on at least one camera device mounted therein. For example, the electronic device 100 may photograph at least a part of the user's body using at least one first camera device disposed in a portion of a front surface of the electronic device 100, or photograph a certain background or object using at least one second camera device disposed in a portion of a rear surface of the electronic device 100.

In one embodiment, the electronic device 100 may provide a photographed image with preview through at least one specified application. For example, the electronic device 100 may provide a photographed image with preview through an execution screen of an application (e.g., a camera application) supporting image photographing. Alternatively, the electronic device 100 may provide a preview image for at least one image photographed (or stored in a memory area) onto an execution screen of an application that supports management (e.g., editing, sharing, or deleting) or playback of photographed images (e.g., a gallery application, a photo editor application, or a video player application). In this operation, the electronic device 100 may display the preview image selected by a user on an execution screen 10 of the application (e.g., screen enlargement), and provide at least one tool menu related to editing of a displayed image (e.g., an adjustment menu, a color tone menu, an effect menu, or a decoration menu) onto a portion of the execution screen 10.

In one embodiment, when a user selects a menu (e.g., an effect menu 1) capable of giving various visual effects to a displayed image among the at least one tool menu, the electronic device 100 may provide at least one image effect filter 11 having different visual effect characteristics to a portion of the execution screen 10. According to various embodiments, the at least one image effect filter 11 may be produced by a supplier of the application (e.g., a manufacturer of the electronic device 100 or a third party application developer) and included as partial data when installing the application.

In various embodiments, the at least one image effect filter 11 provided on the execution screen 10 of the application may be limited in quantity or type. For example, as the at least one image effect filter 11, some of the image effect filters produced by the application supplier may be provided according to the policy of the application supplier or the specification of the execution screen 10 of the application. Alternatively, the at least one image effect filter 11 provided on the execution screen 10 of the application may not include an image effect filter newly produced or updated by the application supplier in real time. Due to this, the at least one image effect filter 11 may be provided in a certain form for a predetermined period (e.g., a period before updating of the application), may be provided in the same or similar form in a plurality of electronic devices, or may not satisfy preferences of various users.

In connection with the above, the electronic device 100 according to an embodiment may recommend an image effect filter that is related at least partially to a user's preference in an image editing operation for at least one photographed image. For example, the electronic device 100 may predict the user's preference based on at least one user activity history related to the operation of the electronic device 100 (e.g., a web page search history, a dialog history, an electronic payment history, or a social network service execution history) and recommend an image effect filter corresponding at least partially to the predicted preference. Hereinafter, various embodiments related to recommendation of an image effect filter and functional operations of components of the electronic device 100 implementing the same will be described.

Figure 2:
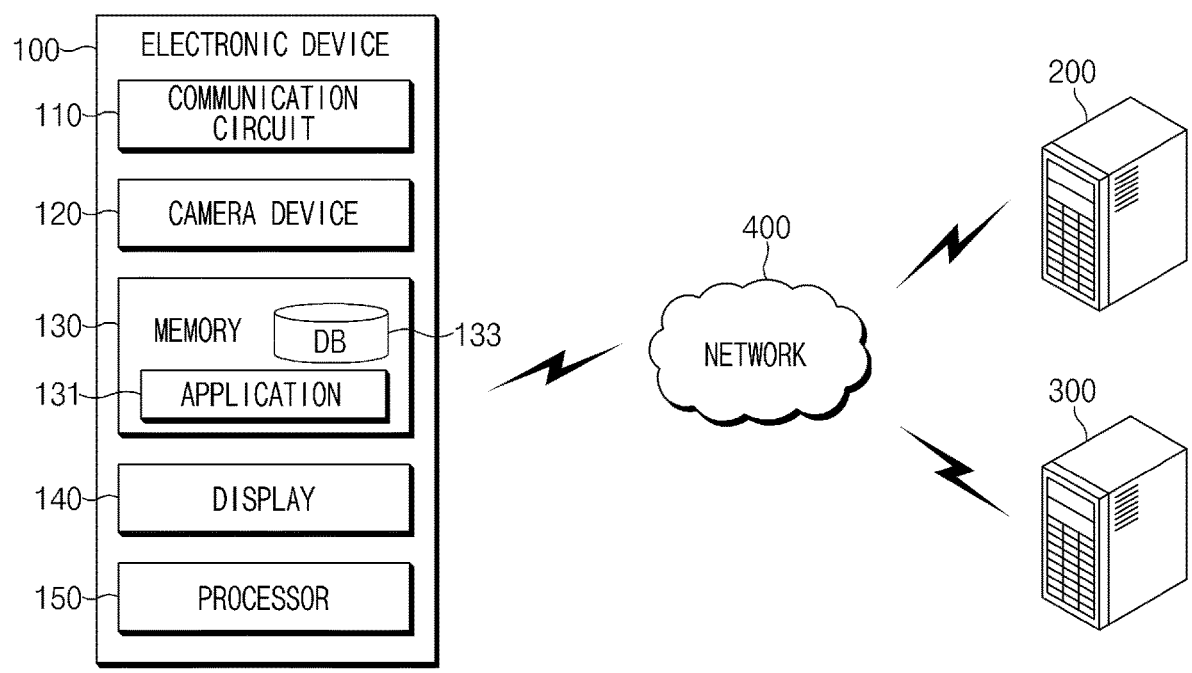
FIG. 2 is a diagram illustrating a configuration of an electronic device according to an embodiment.

FIG. 2 is a diagram illustrating a configuration of an electronic device according to an embodiment.

Referring to FIG. 2, the electronic device 100 may include a communication circuit 110, a camera device 120, a memory 130, a display 140, and a processor 150. According to various embodiments, the electronic device 100 may omit at least one of the components described above, or may additionally include another component. For example, the electronic device 100 may further include a power supply device (e.g., a battery) that supplies power to the components, or a sensor device that senses a variety of information on an operating environment of the electronic device 100 (e.g., a proximity sensor, an illuminance sensor, an acceleration sensor, a fingerprint recognition sensor, or an iris recognition sensor). Alternatively, the electronic device 100 may further include components of an electronic device 701 to be described later with reference to FIG. 7.

The communication circuit 110 may support communication between the electronic device 100 and at least one external device 200 and/or 300. For example, the communication circuit 110 may perform wired communication or wireless communication according to a prescribed protocol with at least one of the server 200 of the manufacturer of the electronic device 100 and a third party application developer's server 300. In this regard, the communication circuit 110 may establish a network 400 with the at least one external device 200 and/or 300, and transmit and receive signals or data to and from at least one external device 200 and/or 300 based on the connection to the network 400 through the wired communication or the wireless communication.

The camera device 120 may photograph an image (e.g., still image or video) for the operating environment of the electronic device 100. In one embodiment, the electronic device 100 may include a plurality of camera devices 120 having different angles of view (or at least partially overlapping angles of view). For example, at least one first camera device of the plurality of camera devices 120 may be disposed in a portion of a front surface of the electronic device 100 to photograph a front area of the electronic device 100, and at least one second camera device may be disposed in a portion of a rear surface of the electronic device 100 to photograph a rear area of the electronic device 100. In various embodiments, an image photographed by the camera device 120 may be stored in the memory 130 according to a user's control or specified scheduling information, or may be transmitted to a specified external device (e.g., a cloud (not shown)) through the communication circuit 110.

The memory 130 may store at least one piece of data related to the operation of the electronic device 100, or may store at least one instruction related to the control of the functional operation of components of the electronic device 100. For example, the memory 130 may store a variety of log information (e.g., app usage information or displaying information) according to the operation of the electronic device 100. Alternatively, the memory 130 may store at least one image photographed by the camera device 120, or downloaded or streamed from a certain external device according to a user's control.

In one embodiment, the memory 130 may store at least one application 131 installed in a preloaded form when the electronic device 100 is manufactured or downloaded from an online market (e.g., an app store). According to an embodiment, the at least one application 131 may include an application that supports photographing management (e.g., editing, sharing, or deletion) or playback of images (e.g., a camera application, a gallery application, a photo editor application, or a video player application, hereinafter referred to as a first application), and may include at least one image effect filter related to editing of a photographed image. Alternatively, the at least one application 131 may include an application which performs a machine learning algorithm-based analysis on at least one specified image, and generates an image effect filter corresponding to a feature of the at least one specified image derived as a result of the analysis.

In one embodiment, the memory 130 may store at least one image effect filter included in the first application in a database 133. In addition, the memory 130 may include at least one image effect filter newly downloaded from or updated by a supplier of the first application (e.g., a manufacturer of the electronic device 100 or a third-party application developer) in the database 133. According to an embodiment, the at least one image effect filter in the database 133 may be mapped to attribute information of the image effect filter (e.g., image effect filter identification information, effect information, design information, or artist information referenced during production) before being stored.

According to various embodiments, the at least one image effect filter in the database 133 may be stored in the form of a filter set under the control of the processor 150. For example, when the database 133 is built (or when the database 133 is updated), at least one image effect filter having similar attribute information may be grouped to constitute one filter set. In one embodiment, the constituted filter set may be given higher-level attribute information (e.g., filter set identifier) of a concept including attribute information of at least one image effect filter included in the filter set.

The display 140 may output various types of content. For example, the display 140 may output an operation screen of the electronic device 100 (e.g., a home screen or an execution screen of the application 131) in response to a user's control or specified scheduling information, or at least one image stored in the memory 130. Alternatively, when a specific image effect filter is selected by a user in an image editing operation for the output image, the display 140 may convert the output image into an image to which the selected image effect filter is applied and output the converted image.

In various embodiments, the display 140 may be implemented with a touch screen display including a display panel, a cover glass, and a touch panel (or a touch sensor). The display panel may receive a driving signal corresponding to image information at a specified frame rate, and output a related screen based on the driving signal. The cover glass may be disposed above the display panel to transmit light according to the screen output of the display panel. In addition, a user input (e.g., touch, drag, press or hovering) by a user body (e.g., finger) or an electronic pen may be applied to at least one region of the cover glass. The touch panel may detect a signal according to a user input (e.g., capacitive detection, pressure-sensitive detection, infrared detection or ultrasonic detection), output the detected signal as an electric signal, and transmit information on the electric signal to the processor 150.

The processor 150 may be implemented with at least one of a central processing unit, an application processor, and a communication processor, and control components of the electronic device 100 described above (e.g., the communication circuit 110, the camera device 120, the memory 130, or the display 140). For example, the processor 150 may be electrically or operatively connected to at least one component to transmit at least one command related to a functional operation to the component, or to perform various communication operations, data processing, or the like.

In one embodiment, the processor 150 may provide (recommend) an image effect filter related at least partially to the user's preference (e.g., tastes, interests, or fields of preference) in an operation of editing at least a part of an image photographed by the camera device 110 (an image stored in the memory 130) in response to the user's control. In this regard, the processor 150 may identify at least one user activity within the specified period by referring to at least one piece of log information (e.g., app usage information or displaying information) stored in the memory 130 at the specified period. The processor 150 may detect at least one information resource that satisfies a specified condition among information resources related to the at least one user activity. The processor 150 may determine that the detected at least one information resource is related to the user's preference, and generate a query for each of the detected information resources. For example, when a specific text is detected as an information resource that satisfies the specified condition, the processor 150 may generate a query for collecting an image effect filter related to the specific text.

In one embodiment, the processor 150 may transmit the generated at least one query to at least one external device 200 and/or 300, and inquire whether the at least one external device 200 and/or 300 includes an image effect filter corresponding to the generated at least one query. When at least a part of the at least one external device 200 and/or 300 includes an image effect filter corresponding to the at least one query, the processor 150 may receive data of the image effect filter corresponding to the at least one query from the external device 200 and/or 300 as a response to the query. The processor 150 may store the image effect filter (or data of the image effect filter) received from the at least one external device 200 and/or 300 in the database 133 of the memory 130. In another embodiment, the processor 150 may determine whether an image effect filter corresponding to the at least one query is included in the database 133 of the memory 130. As a result of the determination, when the image effect filter corresponding to the at least one query is included in the database 133, the processor 150 may load data of the image effect filter onto the memory 130.

According to an embodiment, in an image editing operation based on the execution of the first application, the processor 150 may provide (recommend) an image effect filter corresponding at least in part to the determined user's preference by displaying at least one image effect filter received from the at least one external device 200 and/or 300 or at least one image effect filter loaded onto the memory 130 on the execution screen of the first application.

FIGS. 3A, 3B, 3C, and 3D are diagrams illustrating user-related image effect filter determination types of an electronic device according to various embodiments.

Figure 3A:
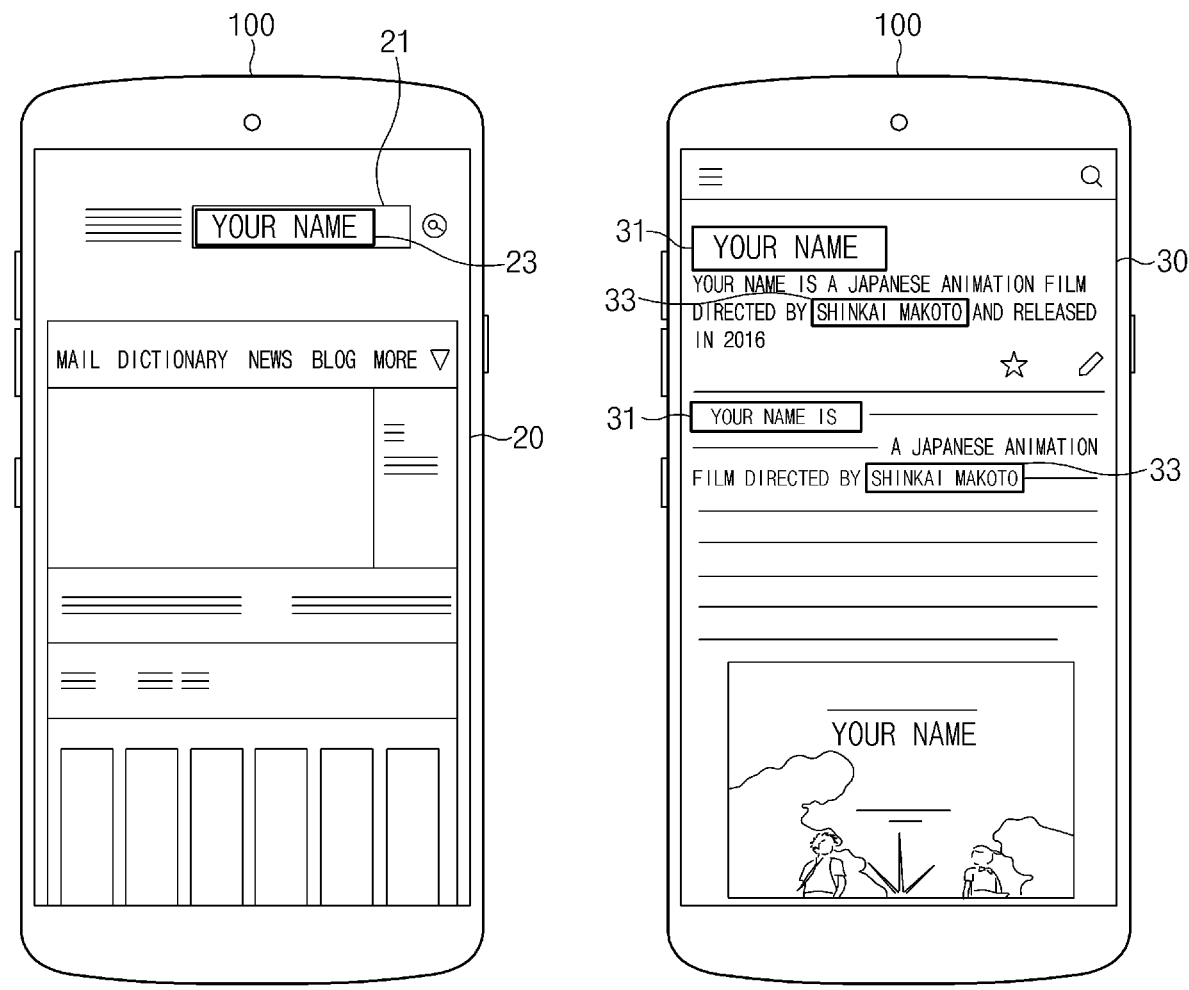
FIG. 3A is a diagram illustrating a user-related image effect filter determination type of an electronic device according to a first embodiment.

Referring to FIG. 3A, the processor 150 (FIG. 2) of the electronic device 100 may identify a search history for a user's searching performed in the at least one application 131 (FIG. 2) as at least a part of the operation of identifying at least one user activity within a specified period as described above. In one embodiment, the search history may include text information input through an input field 21 (e.g., an address window or a search window) included in the execution screen 20 of the application or information on a search result screen 30 output according to searching of the text. According to an embodiment, the processor 150 may collect at least one text information input into the input field 21 within the specified period, and detect text 23 of a specified threshold amount or more based on the collected text information. Alternatively, the processor 150 may detect text 31 and/or 33 appearing in an amount greater than or equal to a specified threshold amount on the search result screen 30 output according to the searching of the text input to the input field 21.

Figure 3B:
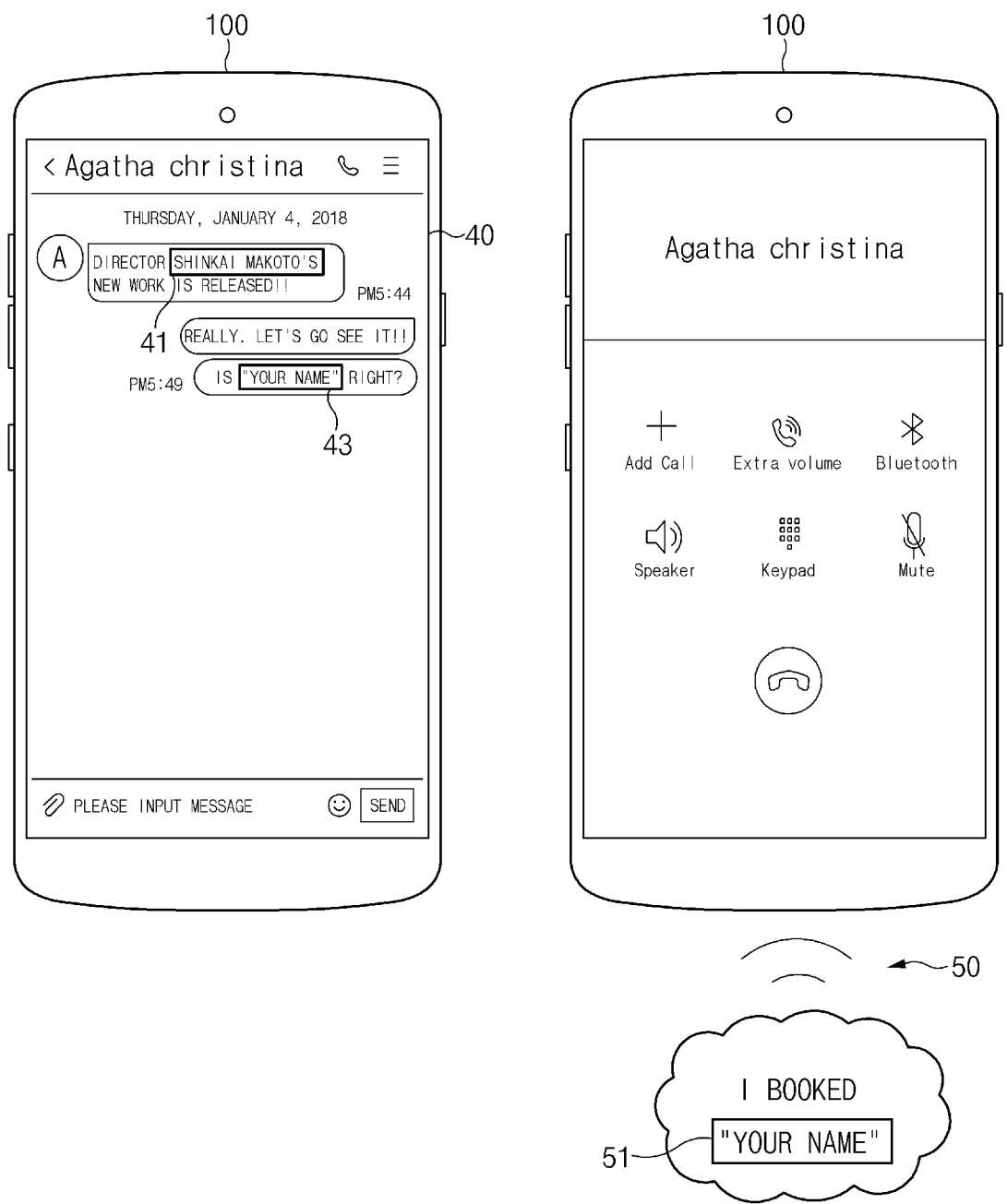
FIG. 3B is a diagram illustrating a user-related image effect filter determination type of an electronic device according to a second embodiment.

Referring to FIG. 3B, the processor 150 of the electronic device 100 may identify a dialog history of a user's dialog performed through the at least one application 131 (FIG. 2) as at least a part of the operation of identifying at least one user activity within the specified period. In one embodiment, the dialog history may include text information received from a dialog counterpart (or an external device of the dialog counterpart), text information input through a SIP (software input panel) keyboard on a dialog screen 40, or text information included in speech data according to a user's utterance 50. According to an embodiment, the processor 150 may collect at least one text information that is received from the dialog counterpart (or an external device of the dialog counterpart) within the specified period and is output onto the dialog screen 40 (e.g., a message screen) or at least one text information output onto the dialog screen 40 according to input through an SIP keyboard, and detect a text 41 and/or 43 of a specified threshold amount or more which is output based on the collected text information. Alternatively, the processor 150 may collect speech data of the user's utterance 50 according to the operation of a dialog-related application (e.g., a call application or a personal assistant application) performed within the specified period, and detect a text 51 of the specified threshold amount or more, included in the speech data.

Figure 3C:
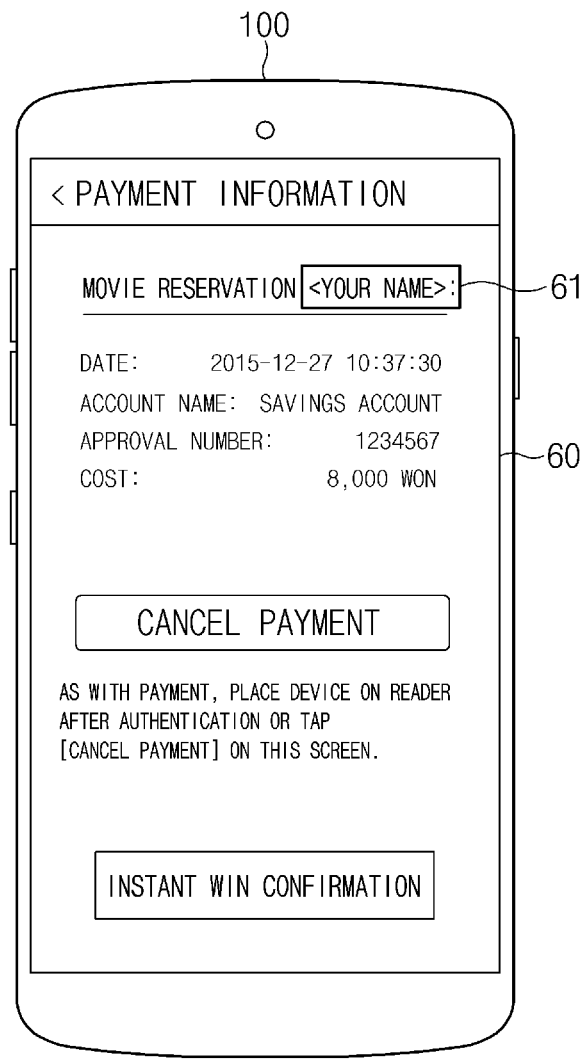
FIG. 3C is a diagram illustrating a user-related image effect filter determination type of an electronic device according to a third embodiment.

Referring to FIG. 3C, the processor 150 of the electronic device 100 may identify an electronic payment service operation history of operation of an electronic payment service performed through at least one application 131 (FIG. 2) as at least a part of the operation of identifying at least one user activity within the specified period. The electronic payment service may be understood as a concept encompassing, for example, a certain ticket reservation service and an online shopping service. According to an embodiment, the processor 150 may identify at least one electronic payment screen 60 output in connection with the operation of the electronic payment service within the specified period, and collect at least one text information included in the electronic payment screen 60. The processor 150 may detect a text 61 of a specified threshold amount or more based on the collected at least one piece of text information.

Figure 3D:
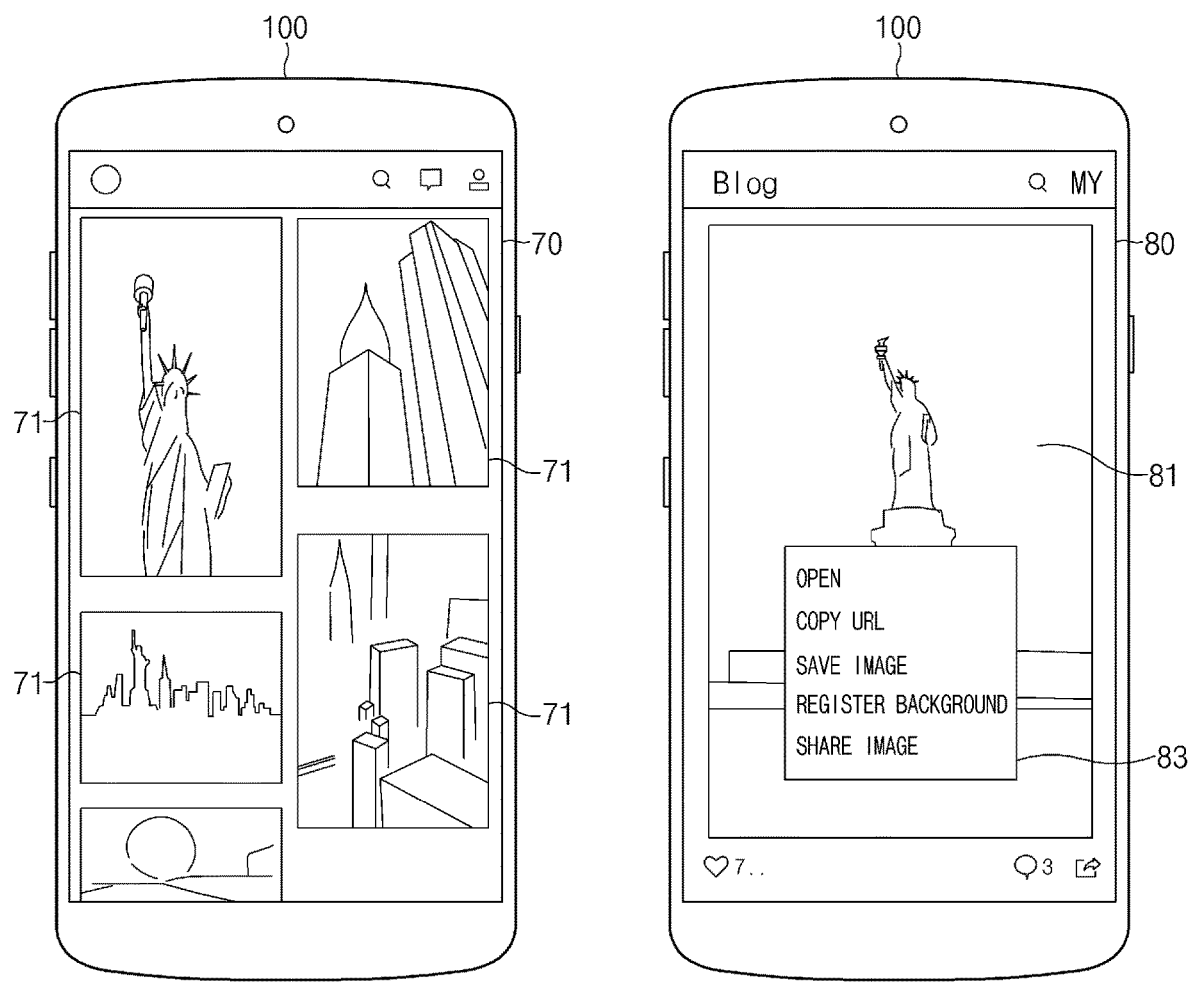
FIG. 3D is a diagram illustrating a user-related image effect filter determination type of an electronic device according to a fourth embodiment.

Referring to FIG. 3D, the processor 150 of the electronic device 100 may identify a content history of content (e.g., still image or video) selected by a user on the at least one application 131 (FIG. 2) as at least a part of the operation of identifying at least one user activity within the specified period. In one embodiment, the content history may include at least one content 71 selected by a user (e.g., like, collecting or sharing) on an execution screen 70 of an application supporting a social networking service. Alternatively, the content history may include at least one content 81 downloaded through a specified menu 83 on an execution screen 80 of a web browsing application. In one embodiment, the processor 150 may collect the selected or downloaded at least one content 71 and/or 81, and identify metadata (e.g., location information) or tag information of the collected content. The processor 150 may detect text of a specified threshold amount or more based on at least one text information included in the metadata or the tag information.

In one embodiment, the processor 150 may detect a text of a specified threshold amount or more for each of the histories according to the above-described activities. For example, the processor 150 may detect a text of the specified threshold amount or more from each of a search history, a dialog history, an electronic payment service operation history, and/or a content history.

In another embodiment, the processor 150 may detect the text of the specified threshold amount or more comprehensively with respect to the histories according to the above-described activities. For example, the processor 150 may collect at least one piece of text information from each of a search history, a dialog history, an electronic payment service operation history, and/or a content history, and detect a text of a specified threshold amount or more from the collected at least one piece of text information. In this operation, even in a case where there is no text of a specified threshold amount or more on the collected at least one piece of text information, when the same text information is collected from each of a plurality of mutually different histories, the processor 150 may determine a text according to the same text information as a text of a specified threshold amount or more. For example, when a first text 23 (e.g., your name) information is collected from the search history, and a second text 61 (e.g., your name) information, which is the same as the first text 23 information is collected from the electronic payment service operation history, the processor 150 may determine and detect the first text 23 and the second text 61 as a text of a specified threshold amount or more, regardless of a collection amount.

In various embodiments, the processor 150 may manage at least one text for excluding detection as a list in relation to the detection of texts of the specified threshold amount or more. For example, the processor 150 may manage at least one text with a daily attribute (e.g., a text that is used frequently in ordinary times, or a text that is used habitually without special meaning) set by the user as a list. The processor 150 may exclude the detection of a text included in the list by referring to the list when detecting a text of the specified threshold amount or more.

In one embodiment, the processor 150 may determine that the detected text of the threshold amount or more is related to the preference of the user of the electronic device 100, and generate a query for collecting at least one image effect filter related to the text of the threshold amount or more. The processor 150 may provide the generated query to at least one external device (e.g., the server 200 of the manufacturer of the electronic device 100 (FIG. 2) and/or the third-party application developer's server 300 (FIG. 2)) that provides an image effect filter to the electronic device 100. The processor 150 may inquire of the at least one external device 200 and/or 300 whether an image effect filter corresponding to the query is included, while transmitting the query, and receive data of the image effect filter corresponding to the query as a response thereto.

Alternatively, the processor 150 may access the database 133 (FIG. 2) that stores an image effect filter included in at least one application (e.g., a camera application, a gallery application, a photo editor application, or a video player application) mounted or installed on the electronic device 100, and determine whether an image effect filter corresponding to the query is included. As a result of the determination, when the image effect filter corresponding to the query is included in the database 133, the processor 150 may load the image effect filter onto the memory 130 (FIG. 2). In various embodiments, when the query corresponds to high-level attribute information (e.g., a filter set identifier) of a specific filter set configured in the database 133, the processor 150 may load at least one image effect filter included in the specific filter set onto the memory 130 or extract and load at least one image effect filter at random.

According to various embodiments, the processor 150 may generate an image effect filter using the at least one content 71 and/or 81 that has been selected or downloaded as described with reference to FIG. 3D. In this regard, the processor 150 may collect the selected or downloaded at least one content 71 and/or 81 and transmit the content to a specified application. The specified application may include, for example, a machine learning algorithm related to image processing, and perform analysis of at least one content 71 and/or 81 using the machine learning algorithm. For example, the specified application may analyze each of the at least one content 71 and/or 81 received from the processor 150, and derive a design pattern or a graphic parameter (e.g., color, depth, contrast, inversion, distortion, pattern or design template), included in the at least one content 71 and/or 81. Alternatively, it may be possible to derive a comprehensive design pattern or a comprehensive graphic parameter by combining design patterns or graphic parameters derived from each of the at least one content 71 and/or 81. The processor 150 may allow the specified application to generate an image effect filter in which the derived design pattern or graphic parameter is able to be visually expressed (or applied).

Figure 4:
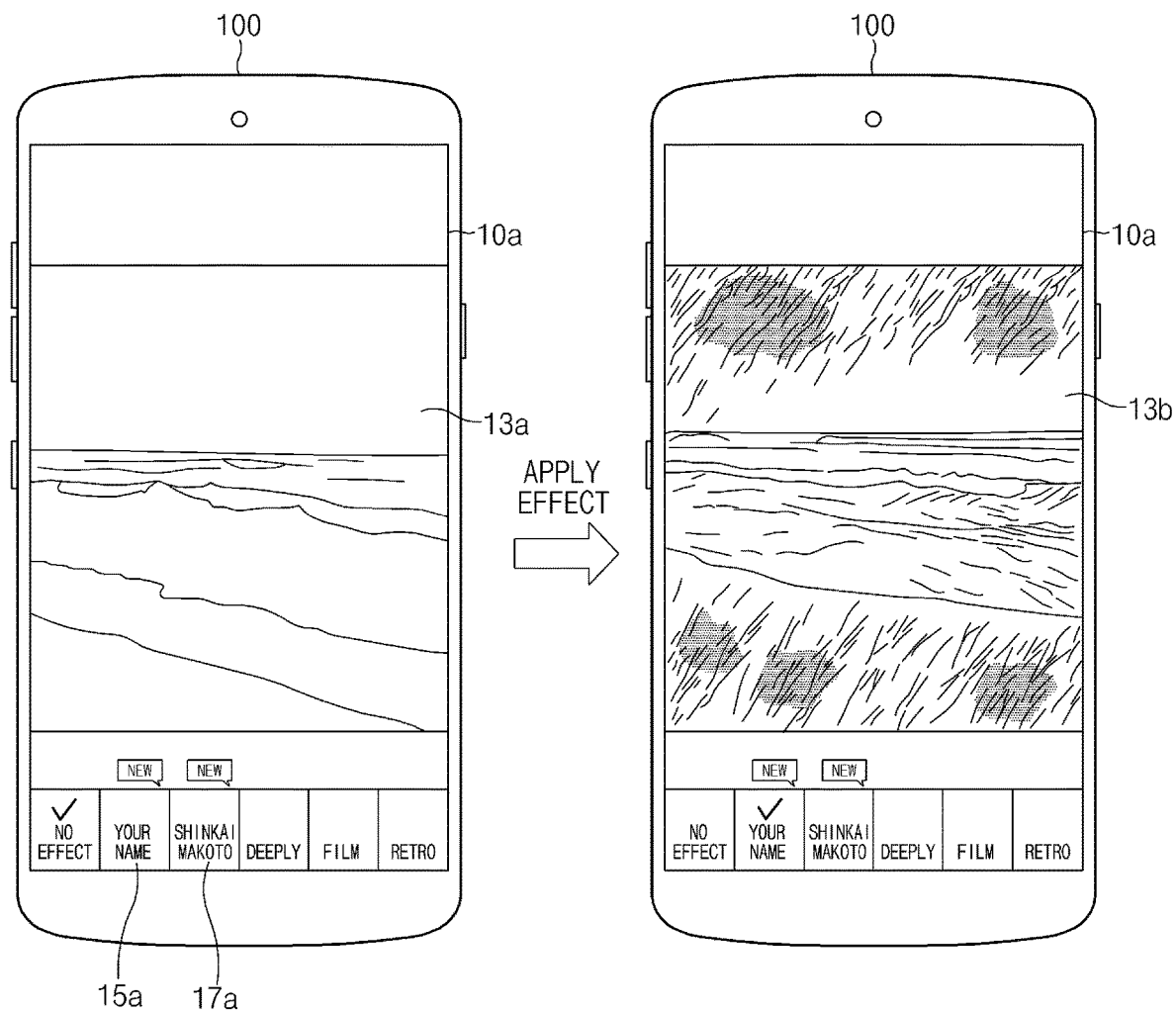
FIG. 4 is a diagram illustrating an application type of an image effect filter of an electronic device according to an embodiment.
Figure 5:
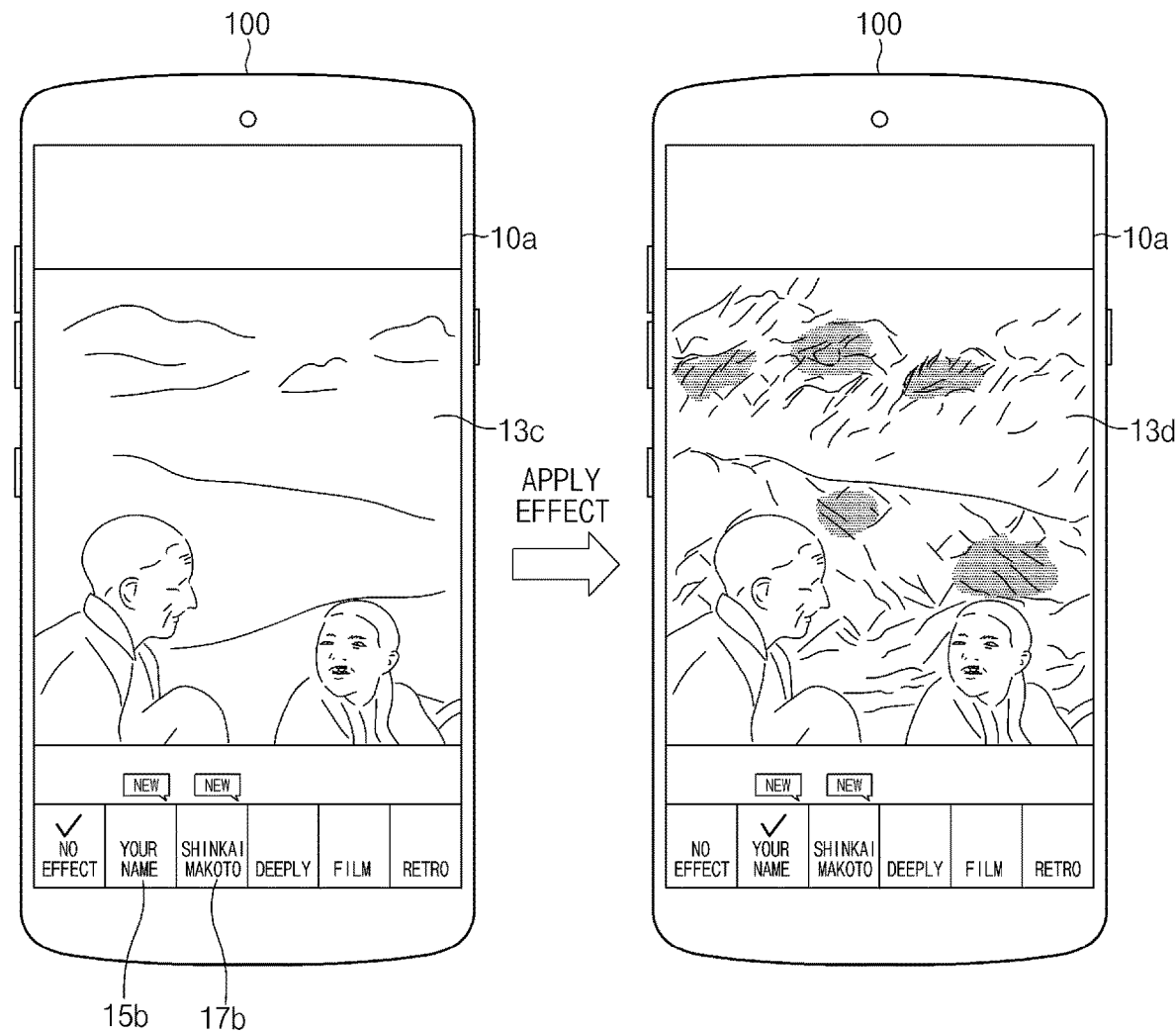
FIG. 5 is a diagram illustrating an application form of an image effect filter of an electronic device according to another embodiment.

FIG. 4 is a diagram illustrating an application form of an image effect filter of an electronic device according to an embodiment, and FIG. 5 is a diagram illustrating an application form of an image effect filter of an electronic device according to another embodiment.

Referring to FIG. 4, the processor 150 (FIG. 2) of the electronic device 100 may display an image 13*a* selected by a user on an execution screen 10*a* of an application (e.g., a camera application, a gallery application, a photo editor application, or a video player application, hereinafter referred to as a first application) that supports photographing, management (e.g., editing, sharing, or deletion), playback, or the like of an image. In addition, the processor 150 may provide at least one image effect filter capable of providing various visual effects to the displayed image 13*a* according to the user's menu operation for the first application to a portion of the execution screen 10*a*. In this operation, the processor 150 may provide (or recommend) at least one user preference-related image effect filter 15*a* and/or 17*a* obtained from at least one external device (e.g., the server 200 of the manufacturer of the electronic device 100 (FIG. 2) and/or a third-party application developer's server 300 (FIG. 2)) or the database 133 (FIG. 2) of the memory 130 (FIG. 2). Alternatively, the processor 150 may obtain and provide (or recommend) at least one image effect filter from an application related to generation of the image effect filter.

In one embodiment, any one of the user preference-related image effect filters 15*a* and/or 17*a* may be selected (e.g., touched) by the user. In this case, the processor 150 may apply the selected image effect filter 15*a* or 17*a* to the displayed image 13*a*. For example, the processor 150 may adjust the graphic parameter (e.g., hue, depth, contrast, inversion, distortion, pattern or design template) of the displayed image 13*a*, while referring to the attribute information (e.g., effect information or design information) of the selected image effect filter 15*a* or 17*a*. The processor 150 may display an image 13*b* to which the selected image effect filter 15*a* or 17*a* is applied on the execution screen 10*a* of the first application, and provide at least one menu (e.g., cancel, share or save) (not shown) related to the operation of the image 13*b*.

Referring to FIG. 5, the processor 150 of the electronic device 100 may determine an attribute (e.g., a person image or a background image) for a displayed image 13*c* in an operation of providing at least one image effect filter capable of giving a visual effect to the image 13*c* displayed on the execution screen 10*a* of the first application. For example, the processor 150 may determine an attribute of the image 13*c* by identifying whether the image 13*c* includes features or outlines related to the face of a human body, based on the image analysis for the displayed image 13*c*.

In one embodiment, the processor 150 may provide only at least one image effect filter 15*b* and/or 17*b* corresponding to the determined attribute of the image 13*c* among at least one user preference-related image effect filter which is obtained from the at least one external device 200 and/or 300 or the database 133 of the memory 130. For example, when the displayed image 13*c* is an image of a person attribute, the processor 150 may provide only an image effect filter produced exclusively for a person image among at least one obtained user preference-related image effect filter. Alternatively, the processor 150 may provide all of the acquired at least one user preference-related image effect filter 15*b* and/or 17*b*, regardless of the attribute of the displayed image 13*c*.

In various embodiments, when an image effect filter exclusively for the background is selected by the user, the processor 150 may partially apply the selected image effect filter exclusively for the background to the displayed image 13*c*. For example, the processor 150 may apply the selected image effect filter exclusively for the background to the background region excluding a facial (or body) region on the displayed image 13*c* detected based on image analysis, and display the image 13*d* to which the image effect filter has been applied.

In various embodiments, the processor 150 may provide a menu (not shown) for accumulating and managing the applied image effect filters in an operation of displaying an image (13*b* in FIG. 4 or 13*d* in FIG. 5) to which an image effect filter has been applied. The processor 150 may manage the applied image effect filter as a separate database in response to a user input to the menu, and provide (or recommend) at least one image effect filter which is accumulated and managed (or managed as a separate database) in an image editing operation for a certain image to be performed.

According to various embodiments, an electronic device may include a communication circuit, at least one camera device, a memory, a display, and, a processor electrically connected to the communication circuit, the at least one camera device, the memory, and the display.

According to various embodiments, the processor may determine a query based on a user activity related to operation of the electronic device, determine whether an image effect filter corresponding to the query is included in at least one external device connected through the communication circuit or the memory, obtain at least one image effect filter corresponding to the query from the at least one external device and the memory when it is determined that the image effect filter corresponding to the query is included in the at least one external device or the memory, output an image photographed by the at least one camera device through the display, and provide the obtained at least one image effect filter when an event related to editing of the output image occurs.

According to various embodiments, the memory may include at least one editing application for supporting editing of the image photographed by the at least one camera device, and According to various embodiments, the processor may provide the obtained image effect filter onto an execution screen of the at least one editing application.

According to various embodiments, the processor may store the obtained at least one image effect filter in the memory after mapping the obtained at least one image effect filter to attribute information of the obtained at least one image effect filter.

According to various embodiments, the processor may identify at least one log information stored in the memory at a specified period to identify the user activity.

According to various embodiments, the processor may determine, as the query, at least one text of a specified threshold amount or more, detected from a search history of a user, performed within the specified period in at least one application included in the memory, as at least a part of the operation of determining the query.

According to various embodiments, the processor may determine, as the query, at least one text of a specified threshold amount or more detected from a dialog history of the user performed within the specified period through at least one application included in the memory, as at least a part of the operation of determining the query.

According to various embodiments, the processor may determine, as the query, at least one text of a specified threshold amount or more detected from an electronic payment service operation history performed within the specified period through at least one application included in the memory, as at least a part of the operation of determining the query.

According to various embodiments, the processor may determine, as the query, at least one text of a specified threshold amount or more detected from a content history selected by a user within the specified period through at least one application included in the memory, as at least a part of the operation of determining the query.

According to various embodiments, the processor may individually perform detection of the text of the specified threshold amount or more for at least one of the search history, the dialog history, the electronic payment service operation history, and the content history.

According to various embodiments, wherein the processor may collect at least one text from at least one of the search history, the dialog history, the electronic payment service operation history, and the content history and perform detection of the text of the specified threshold amount or more on the collected at least one text.

According to various embodiments, the processor may manage at least one text for being excluded from detection of a text of the specified threshold amount or more as a list.

According to various embodiments, the processor may at least partially apply an image effect filter, which is selected by a user among the provided at least one image effect filter, to an image output through the display.

According to various embodiments, the processor may determine a attribute of an image output through the display, and provide at least one image effect filter corresponding to an attribute of the image among the obtained at least one image effect filter.

Figure 6:
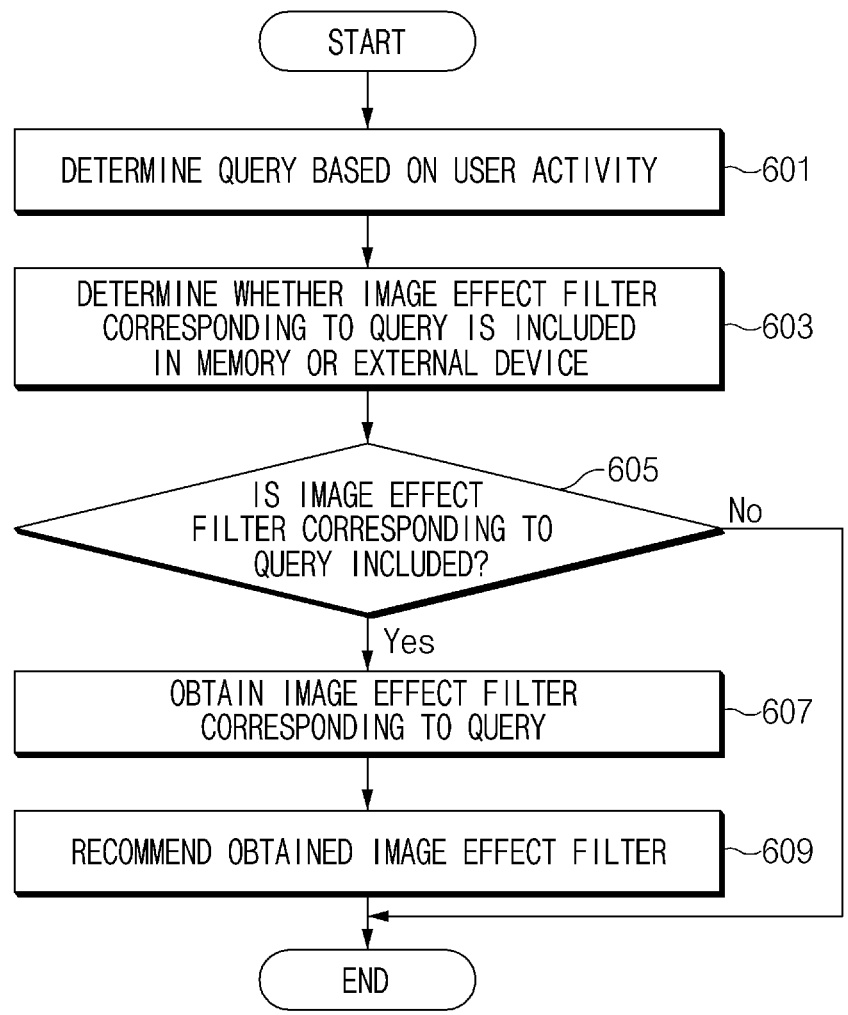
FIG. 6 is a diagram illustrating a method of supporting image editing in an electronic device according to an embodiment.

FIG. 6 is a diagram illustrating a method of supporting image editing in an electronic device according to an embodiment.

Referring to FIG. 6, in operation 601, a processor (150 in FIG. 2) of an electronic device (100 in FIG. 2) may determine a query based on a user activity. In this regard, the processor 150 identify at least one user activity (e.g., search history, dialog history, electronic payment service operation history or content history) within the specified period by referring to at least one piece of log information (e.g., app usage information or displaying information) stored in the memory 130 at the specified period. The processor 150 may detect at least one information resource that satisfies a specified threshold amount or more among information resources (e.g., text data) related to the at least one user activity. The processor 150 may determine that the detected at least one information resource is related to the user's preference, and generate a query for obtaining an image effect filter corresponding to each information resource.

In operation 603, the processor 150 may determine whether an image effect filter corresponding to the determined query is included in the memory 130 or at least one external device (200 and/or 300 in FIG. 2). For example, the processor 150 may transmit the generated query to the at least one external device 200 and/or 300 and may inquire whether an image effect filter corresponding to the query is included. Alternatively, the processor 150 may determine whether the image effect filter corresponding to the query is included in a database (133 of FIG. 2) of the memory 130 which is built to include at least one image effect filter.

In operation 605, when it is determined that the image effect filter corresponding to the query is included in the at least one external device 200 and/or 300 or the database 133, in operation 607, the processor 150 may obtain an image effect filter corresponding to the query from the at least one external device 200 and/or 300 or the memory 130. [96] In operation 609, the processor 150 may provide (or recommend) at least one image effect filter obtained from the at least one external device 200 and/or 300 or the memory 130 in an image editing operation based on execution of an application for supporting photographing, management (e.g., editing, sharing, or deleting), playback, or the like (e.g., a camera application, a gallery application, a photo editor application, a video player application). In one embodiment, the processor 150 may at least partially apply an image effect filter selected by a user among the provided at least one image effect filter to an image to be edited.

According to various embodiments, a method for supporting image editing in an electronic device may include determining a query based on a user activity related to operation of the electronic device, determining whether an image effect filter corresponding to the query is included in at least one external device or a memory, obtaining at least one image effect filter corresponding to the query from the at least one external device and the memory when it is determined that the image effect filter corresponding to the query is included in the at least one external device or the memory, outputting an image stored in the memory through a display of the electronic device, and providing the obtained at least one image effect filter when an event related to editing of the output image occurs.

According to various embodiments, the determining of the query may include identifying at least one log information stored in the memory at a specified period to identify the user activity.

According to various embodiments, the determining of the query may include determining, as the query, at least one text of a specified threshold amount or more detected from a search history of a user performed within the specified period in at least one application included in the memory.

According to various embodiments, the determining of the query may include determining, as the query, at least one text of a specified threshold amount or more detected from a dialog history of the user performed within the specified period through at least one application included in the memory;

According to various embodiments, the determining of the query may include determining, as the query, at least one text of a specified threshold amount or more detected from an electronic payment service operation history performed within the specified period through at least one application included in the memory; and According to various embodiments, the determining of the query may include determining, as the query, at least one text of a specified threshold amount or more detected from the content history selected by the user within the specified period through at least one application included in the memory.

According to various embodiments, the method may further include at least partially applying an image effect filter, which is selected by a user among the provided at least one image effect filter, to an image output through the display.

Figure 7:
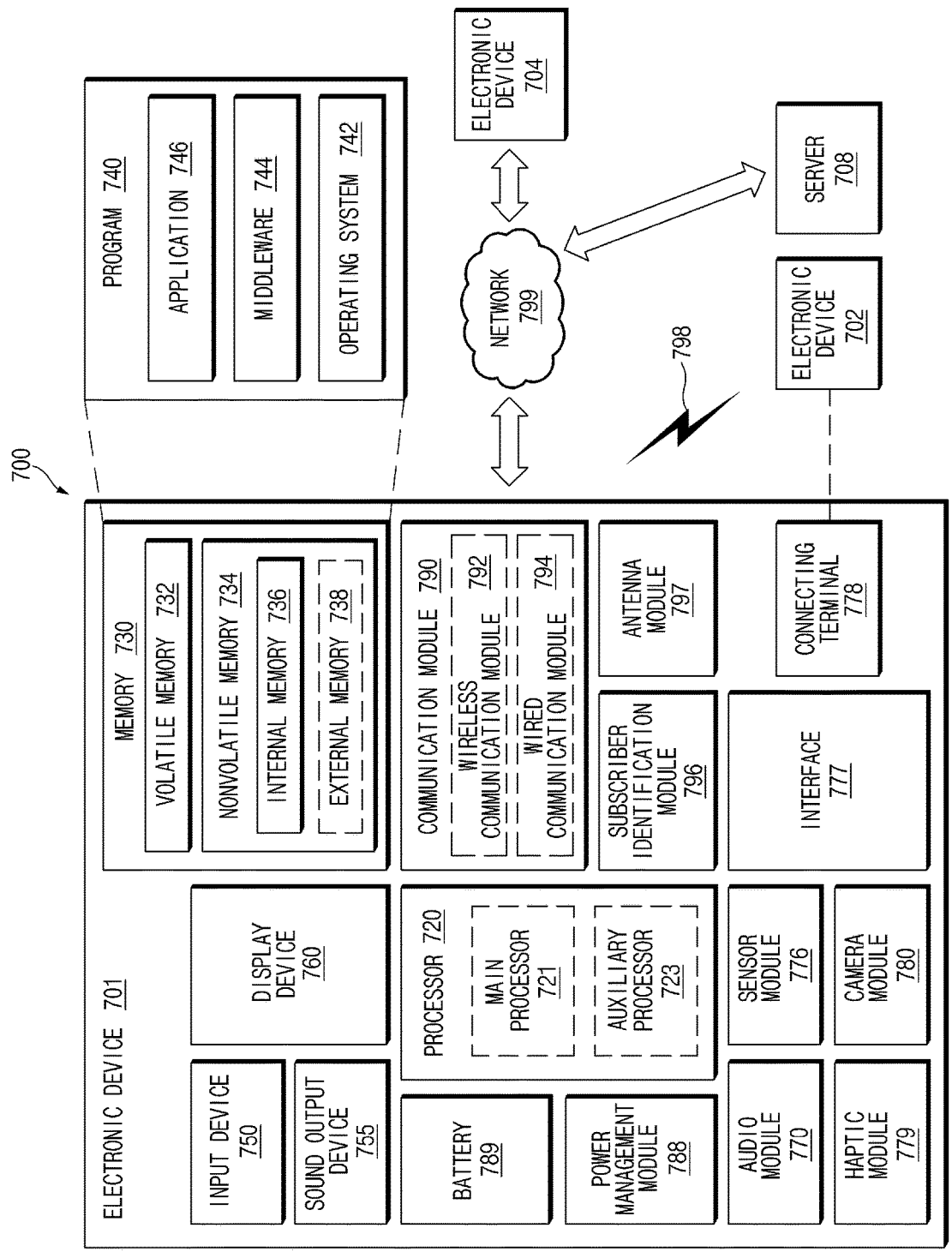
FIG. 7 is a block diagram of an electronic device in a network environment according to various embodiments.

FIG. 7 is a block diagram of an electronic device in a network environment according to various embodiments.

Referring to FIG. 7, an electronic device 701 may communicate with an electronic device 702 through a first network 798 (e.g., a short-range wireless communication) or may communicate with an electronic device 704 or a server 708 through a second network 799 (e.g., a long-distance wireless communication) in a network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 may be a device for visually presenting information to the user of the electronic device 701 and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 740) including an instruction stored in a machine-readable storage media (e.g., an internal memory 736 or an external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a communication circuit;
at least one camera device;
a memory;
a display; and
a processor electrically connected to the communication circuit, the at least one camera device, the memory, and the display;
wherein the processor is configured to:
determine a query based on a user activity related to operation of the electronic device,
determine whether an image effect filter corresponding to the query is included in at least one external device connected through the communication circuit or the memory,
obtain at least one image effect filter corresponding to the query from the at least one external device and the memory when it is determined that the image effect filter corresponding to the query is included in the at least one external device or the memory,
output an image photographed by the at least one camera device through the display, and
provide the obtained at least one image effect filter when an event related to editing of the output image occurs.

2. The electronic device of claim 1, wherein the memory includes at least one editing application for supporting editing of the image photographed by the at least one camera device, and
wherein the processor is configured to provide the obtained image effect filter onto an execution screen of the at least one editing application.

3. The electronic device of claim 1, wherein the processor is configured to store the obtained at least one image effect filter in the memory after mapping the obtained at least one image effect filter to attribute information of the obtained at least one image effect filter.

4. The electronic device of claim 1, wherein the processor is configured to determine, as the query, at least one text of a specified threshold amount or more detected from a search history of a user performed within a specified period in at least one application included in the memory, as at least a part of an operation of determining the query.

5. The electronic device of claim 4, wherein the processor is configured to determine, as the query, at least one text of a specified threshold amount or more detected from a dialog history of the user performed within the specified period through at least one application included in the memory, as at least a part of the operation of determining the query.

6. The electronic device of claim 5, wherein the processor is configured to determine, as the query, at least one text of a specified threshold amount or more detected from an electronic payment service operation history performed within the specified period through at least one application included in the memory, as at least a part of the operation of determining the query.

7. The electronic device of claim 6, wherein the processor is configured to determine, as the query, at least one text of a specified threshold amount or more detected from a content history selected by the user within the specified period through at least one application included in the memory, as at least a part of the operation of determining the query.

8. The electronic device of claim 7, wherein the processor is configured to individually perform detection of the text of the specified threshold amount or more for at least one of the search history, the dialog history, the electronic payment service operation history, and the content history.

9. The electronic device of claim 7, wherein the processor is configured to collect at least one text from at least one of the search history, the dialog history, the electronic payment service operation history, and the content history and perform detection of the text of the specified threshold amount or more on the collected at least one text.

10. The electronic device of claim 7, wherein the processor is configured to manage at least one text for being excluded from detection of a text of the specified threshold amount or more as a list.

11. The electronic device of claim 1, wherein the processor is configured to at least partially apply an image effect filter, which is selected by a user among the provided at least one image effect filter, to an image output through the display.

12. The electronic device of claim 1, wherein the processor is configured to determine an attribute of an image output through the display, and provide at least one image effect filter corresponding to an attribute of the image among the obtained at least one image effect filter.

13. A method for supporting image editing in an electronic device, comprising:
 determining a query based on a user activity related to operation of the electronic device;
 determining whether an image effect filter corresponding to the query is included in at least one external device or a memory;
 obtaining at least one image effect filter corresponding to the query from the at least one external device and the memory when it is determined that the image effect filter corresponding to the query is included in the at least one external device or the memory;
 outputting an image stored in the memory through a display of the electronic device; and
 providing the obtained at least one image effect filter when an event related to editing of the output image occurs.

14. The method of claim 13, wherein the determining of the query includes at least one of:
 determining, as the query, at least one text of a specified threshold amount or more detected from a search history of a user performed within a specified period in at least one application included in the memory;
 determining, as the query, at least one text of a specified threshold amount or more detected from a dialog history of the user performed within the specified period through at least one application included in the memory;
 determining, as the query, at least one text of a specified threshold amount or more detected from an electronic payment service operation history performed within the specified period through at least one application included in the memory; and
 determining, as the query, at least one text of a specified threshold amount or more detected from a content history selected by the user within the specified period through at least one application included in the memory.

15. The method of claim 13, further comprising:
 at least partially applying an image effect filter, which is selected by a user among the provided at least one image effect filter, to an image output through the display.

* * * * *